E. BLACKMAN.
Assignor of one-half Interest to A. H. BYINGTON.
LAMP-CHIMNEY.
No. 7,418. Reissued Dec. 5, 1876.
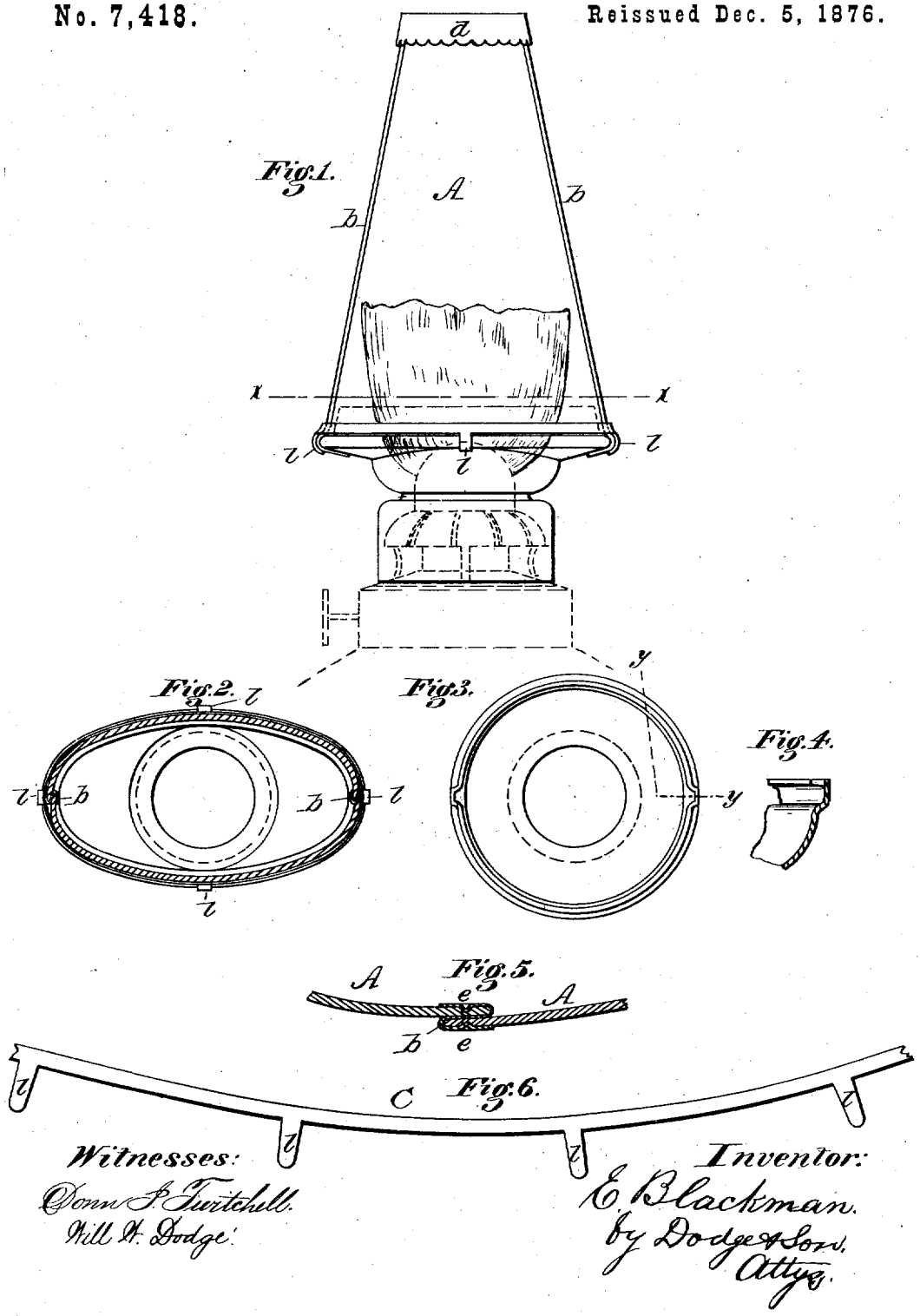
Witnesses:
Donn S. Turtchell.
Will H. Dodge.
Inventor:
E. Blackman.
by Dodge & Son.
Attys.
THE GRAPHIC CO. N.Y.

UNITED STATES PATENT OFFICE.

EBENEZER BLACKMAN, OF NEW YORK, N. Y., ASSIGNOR OF ONE-HALF INTEREST TO A. HOMER BYINGTON, OF NORWALK, CONNECTICUT.

IMPROVEMENT IN LAMP-CHIMNEYS.

Specification forming part of Letters Patent No. 123,325, dated February 6, 1872; reissue No. 7,418, dated December 5, 1876; application filed November 16, 1876.

DIVISION B.

*To all whom it may concern:*

Be it known that I, EBENEZER BLACKMAN, of New York, in the county of New York and State of New York, have invented certain new and useful Improvements in Lamp-Chimneys; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a mica lamp-chimney, as hereinafter more fully explained.

In the drawing, Figure 1 is a side elevation of the chimney complete, as applied to a lamp; Fig. 2, a cross-section of the same, on the line *x x* of Fig. 1. Figs. 3 and 4 relate to a glass base, which, being the subject of a separate application, need not be further spoken of in this case; and Figs. 5 and 6 are views showing details of construction.

In constructing the chimney I prepare two sheets of mica, A, of suitable size and form, and unite their vertical edges by a thin and narrow strip of sheet metal, *b*, bent longitudinally in the form of a letter S, as shown in section in Fig. 5. After inserting the adjoining edges of the mica sheets A in the grooves formed by thus bending the metal strips *b*, the metal is indented as represented at *e*, Fig. 5, thereby locking the parts firmly together.

These indentations may be formed along the whole length of the strips *b*, or they may be made only at intervals, as may be found necessary. I then secure around the top a narrow band, *d*, and around the bottom another band, C, which has a series of projections, *l*, on its lower edge, as represented in Fig. 6, and also in Fig. 1, where they are shown bent under the shoulder of the base, their object being to fasten the mica chimney securely to the base. The bottom of the chimney is made to fit over the top of the oval base B, which is made slightly inclined for that purpose, and it may be fastened by extending the strips *b* down far enough to bend them under the shoulder, in which case the projections *l* on the band C may be omitted; but I prefer to use the latter, as it renders the union of the chimney more secure and firm.

Although I prefer the oval form already described, and represented in Figs. 1 and 2, it is obvious they may be made circular, the chimney being secured in the manner already described; or, if preferred, the chimney may be made to fit inside of the base, in which case the chimney will be made with external projections at its lower end to lock into the base. The locking projections may be formed on the strips *b*, in case the band C is not used, or on the band C if the latter is used. The band C is as necessary where the bottom of the chimney fits within the base as where it fits over or outside of the base, as it must when the oval form is used.

Having thus described my invention, what I claim is—

1. A lamp-chimney consisting of sheets of mica, united by means of the doubled and indented or perforated metal strips *b*, and a metal band at top and bottom, substantially as shown and described.

2. The mica chimney A, provided with projections for locking or securing it to a base, B, substantially as set forth.

EBENEZER BLACKMAN.

Witnesses:

JACOB DU BOIS,

C. M. BENJAMIN.